United States Patent
McGlothlin

[11] 3,756,634
[45] Sept. 4, 1973

[54] FERRULE LOCK
[76] Inventor: Charles J. McGlothlin, Rt. 1, Box 198, Madison Heights, Va. 24572
[22] Filed: Dec. 2, 1971
[21] Appl. No.: 204,251

[52] U.S. Cl. .......................... 287/119 R, 24/126 C
[51] Int. Cl. ............................................. F16b 7/00
[58] Field of Search ...................... 279/1 B, 28, 58; 287/119 R, 83, DIG. 13, 91; 294/86.17, 86.31, 86.33, 102, 102 A; 24/126 C

[56] References Cited
UNITED STATES PATENTS
1,849,101  3/1932  Livergood ..................... 287/119 R
1,190,491  7/1916  Watts et al. ................... 287/119 R
3,383,128  5/1968  Napple .............................. 287/83
  751,345  2/1904  Saunders ............................ 279/28

2,811,378 10/1957 Kalista ................................ 287/91

FOREIGN PATENTS OR APPLICATIONS
506,646  5/1939  Great Britain ................. 287/119 R Primary Examiner—Andrew V. Kundrat
Attorney—David H. Semmes

[57] ABSTRACT

A ferrule lock or coupling device embodying a coupling housing enclosing an expansible ferrule and an axial independent locking pin having an enlarge taper axially engageable within said ferrule. The ferrule is longitudinally reciprocable within said coupling housing so as to be enlarged and thereby release said locking pin. The device has particular use in coupling of electric cables, air hoses, tire chains, and the like, providing a strong yet quick disconnect.

9 Claims, 4 Drawing Figures

INVENTOR
CHARLES J. McGLOTHLIN

ATTORNEYS

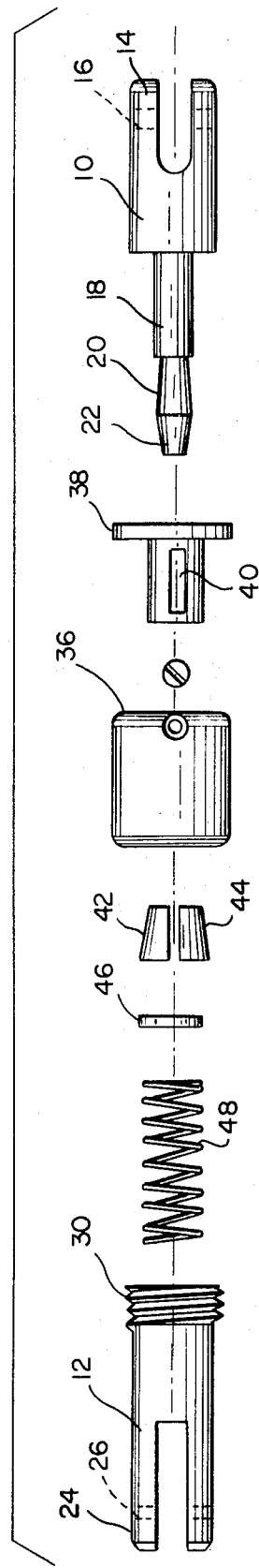
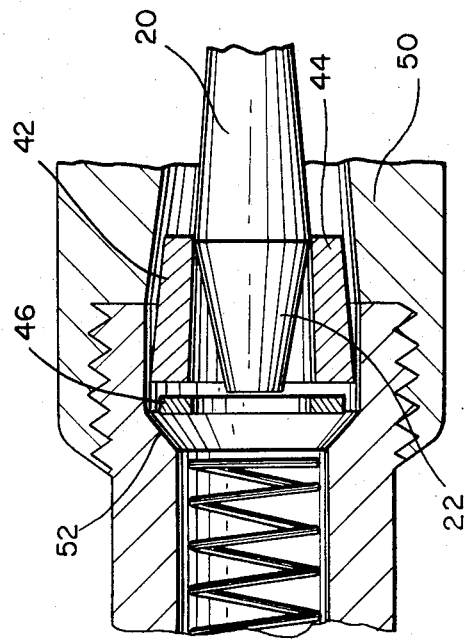

3,756,634

FERRULE LOCK

BACKGROUND OF THE INVENTION

1. Field of the Invention

Quick disconnect coupling devices. Earlier inventors have attempted to provide means for coupling cables, chains, electric lines or the like together. Conventionally such couplings have embodied a coupling housing fitted onto one line and a locking pin or head fitted onto the other line. The locking pin or head is insertable into the coupling housing and conventionally is locked there by a perpendicularly extending pin. The strength of the coupling is thus dependent upon the strength of the pin. A severe pull can result in immediate shearing of the pin and breaking of the lock.

2. Description of the Prior Art:

J. R. Metz—3,378,891—4-23-68
C. G. Pressley—3,413,692—12-3-68
A. McKelvey, Jr.—3,489,273—1-13-70
R. J. Gray—2,777,716—1-15-57

Pressley shows jaws which are actually movable against the action of a spring to a retracted position and they can be spread to receive an enlargement of an inserted cable end. A grippable sleeve on the Pressley body is shiftable to axially retract the jaws for receiving the enlargement.

Metz shows a cable enlargement clasp using opposed jaws to receive an enlargement therebetween. The jaws and interior of the body have cam surfaces which force the jaws together to grip the enlargement when the jaws are shifted axially toward the body mouth by a spring. A sleeve slidable on the body yet connected to the jaws and serves to shift them to release the enlargement. McKelvey and Gray similarly relate to locking members having an enlarged locking portion.

SUMMARY OF THE INVENTION

According to the present invention, a tapered end is insertable into a split ferrule, which opens, as the pin passes axially therethrough. As the pin approaches the ferrule, a compression spring seat permits the ferrule to be advanced axially so as to expand and then close upon the pin as the pin is retracted. Attempting to pull the halves apart serves to bind the pin and ferrule tighter together. A core guide piece is provided so as to enable depressing of the spring and opening of the ferrules to release the pin. Both the coupling housing and the ferrule may have yoke members for securing any number of cables, chains, rods or the like thereto.

BRIEF DESCRIPTION OF THE DRAWINGS

FIG. 2 is an exploded side elevation, showing the ferrule lock components;

FIG. 4 is a fragmentary vertical section, showing the ferrule and washer advanced into the expansion chamber such that the ferrules are expanded radially to permit withdrawal of the locking pin from the chamber.

Figure 1:
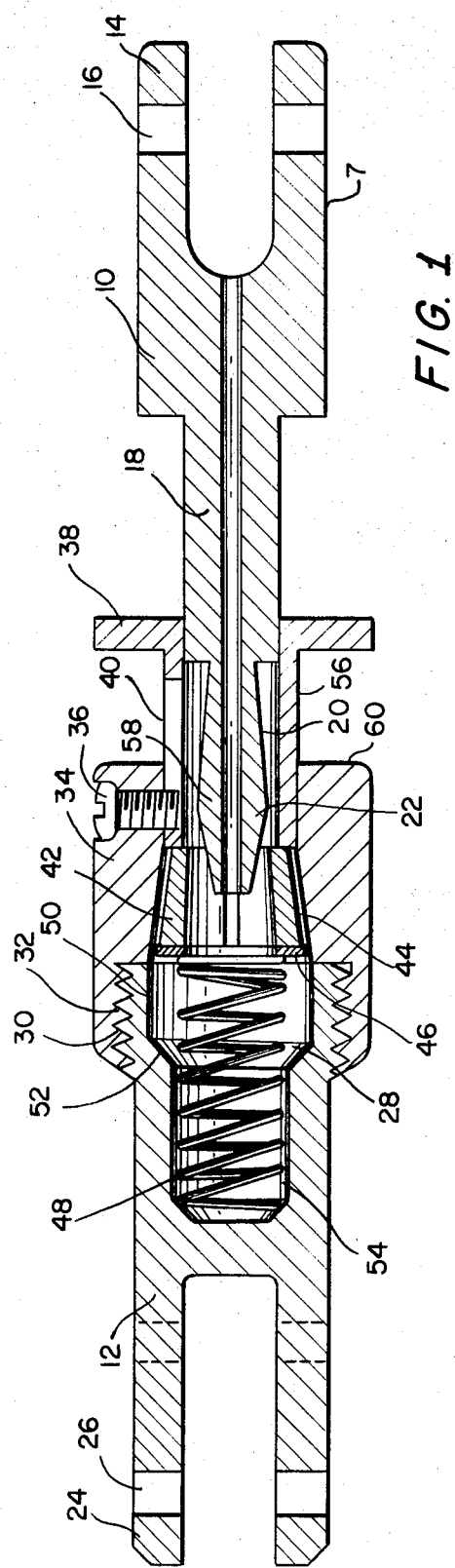
FIG. 1 is a longitudinal section showing the locking end being advanced axially, inwardly of the ferrule, prior to locking of the taper within the ferrule.

DESCRIPTION OF THE PREFERRED EMBODIMENTS:

In FIG. 1 the ferrule lock device is illustrated as compriesd of an independent locking pin portion 10 and a coupling housing 12. Lock pin portion 10 includes an axial shaft having a tapered locking pin 20, having an enlarged shoulder 58 and a reduced diameter head 22. A yoke member 14 may be provided with a locking bore 16.

Coupling housing 12 may embody a similar yoke 24 having a locking bore 26, an axial spring seating chamber 54 and an enlarged diameter ferrule expansion chamber 50 with an inclined shoulder 52 interconnecting the chambers. An exterior housing coupling limiting piece 34 may be secured to member 12 by menas of threads 32 engaging coupling housing threads 30. Split ferrules 42 and 44 may be seated within coupling piece 34 with a washer or like means 46 interposed between the ferrules and the compression spring 48. A core guide piece 38 having a longitudinally extending shaft 56 with longitudinal slot 40, and an outer peripheral flange 38 is insertable into the housing extension piece so that the inner ends of shaft 56 engage the ferrule tips, as illustrated. A set screw 36 or like member may be seated in piece 34 so as to extend into slot 40 and thereby limit the extensibility of core guide piece 38.

Figure 3:
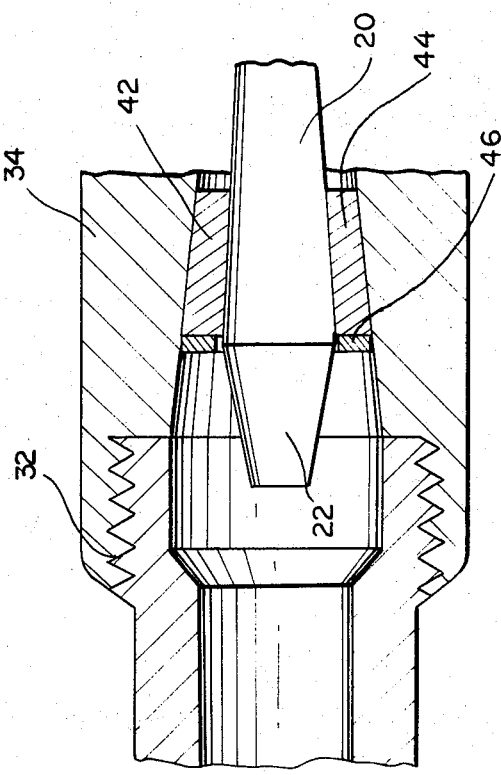
FIG. 3 is a fragmentary vertical section, showing the locking pin taper locked by means of the ferrules.

In FIG. 1 the locking pin is shown in an attitude of being inserted axially inwardly of the ferrules. The taper on the locking pin will thus urge the ferrules axially into the expansion chamber 50 permitting the ferrules to slip over the taper shoulder 58. As axial compression is released, ferrule 42 and 44 grip the taper, as illustrated in FIG. 3. The locking pin cannot be released, until core guide piece 38 is urged axially inwardly, such that flange 38 substantially abuts the walls of the extension piece. This action results in the inner extremities of core guide shaft pushing ferrules 42 and 44 into expansion chamber 50 so that the ferrules expand diametrically, permitting release of the locking pin, as illustrated in FIG. 4.

Manifestly, the ferrules, pin and housing may be modified extensively without departing from the spirit and scope of the invention.

I claim:

1. A ferrule lock of the type adapted for axial coupling, comprising:
  A. a coupling housing having an inner chamber communicating with an open end and including:
    i. a compression spring means seated within said inner chamber;
    ii. at least two ferrules abutting said compression spring at one end in said chamber and extensible away from said compression member at the other end;
  B. a core guide piece having an elongated shaft with a longitudinal slot and being reciprocably supported in said chamber and slidably engaging the outer end of said ferrules within said open end of said housing; and
  C. an independent axial locking pin having an exterior yoke connector piece and an enlarged taper portion extensible through said core quide piece and axially of said ferrules so that said taper is complementally lockingly engaged inwardly of said ferrules, said ferrules being truncated such that their inner diameter at the outer end is less than the exterior diameter of said taper in said locking pin.

2. A ferrule lock of the type adapted for axial coupling as in claim 1, said core guide piece having an exterior peripheral flange, limiting extensibility of said guide piece within said coupling housing.

3. A ferrule lock of the type adapted for axial coupling as in claim 2, said coupling housing having a set screw member extending radially into said inner chamber, so as to engage said slot in said core guide piece, limiting outward extensibility of said core guide piece.

4. A ferrule lock of the type adapted for axial coupling as in claim 3, said core guide piece shaft having its inner end abutting said ferrules.

5. A ferrule lock of the type adapted for axial coupling as in claim 4, including a washer member interposed between said compression spring and two semi-cylindrical truncated ferrules within said housing.

6. A ferrule lock of the type adapted for axial coupling as in claim 5, said coupling housing having a base portion with an inner chamber defining a seat for said compression spring and an enlarged diameter ferrule expansion recess defining an enlarged seat for said washer and said ferrules during compression of said spring.

7. A ferrule lock of the type adapted for axial coupling as in claim 6, said coupling housing including an outer extension piece threadably engaged with said housing and said outer extending piece having an inner core sidably supporting said washer, said ferrule and said core guide piece.

8. A ferrule lock of the type adapted for axial coupling as in claim 7, said outer extension piece core having an inner diameter substantially equivalent to the outer diameter of said core guide, said ferrule and said washer.

9. A ferrule lock of the type adapted for axial coupling as in claim 8, said core guide piece being extensible inwardly axially so as to compress said spring and push said washer and said ferrules into said ferrule expansion recess thereby releasing the taper portion of said locking pin from the grip of said ferrules.

* * * * *